(12) United States Patent
Henrikson

(10) Patent No.: US 6,894,715 B2
(45) Date of Patent: May 17, 2005

(54) MIXING VIDEO SIGNALS FOR AN AUDIO AND VIDEO MULTIMEDIA CONFERENCE CALL

(76) Inventor: Eric Harold Henrikson, 4516 159th Ave. NE., Redmond, WA (US) 98052

( * ) Notice: Subject to any disclaimer, the term of this patent is extended or adjusted under 35 U.S.C. 154(b) by 300 days.

(21) Appl. No.: 09/883,475

(22) Filed: Jun. 16, 2001

(65) Prior Publication Data
US 2002/0191072 A1 Dec. 19, 2002

(51) Int. Cl.[7] .................................................. H04N 7/14
(52) U.S. Cl. .............................. 348/14.07; 348/14.11; 370/263
(58) Field of Search ........................... 348/14.01–14.03, 348/14.07–14.09, 14.1, 14.11, 14.12; 370/260–263; 709/204; 345/753

(56) References Cited

U.S. PATENT DOCUMENTS

| | | | | |
|---|---|---|---|---|
| 5,382,972 A | * | 1/1995 | Kannes | 348/14.07 |
| 5,768,263 A | * | 6/1998 | Tischler et al. | 370/263 |
| 5,801,756 A | * | 9/1998 | Iizawa | 348/14.11 |
| 5,991,277 A | * | 11/1999 | Maeng et al. | 370/263 |
| 6,269,483 B1 | * | 7/2001 | Broussard | 725/143 |

FOREIGN PATENT DOCUMENTS

| | | | | |
|---|---|---|---|---|
| JP | 04373385 A | * | 12/1992 | H04N/7/15 |
| JP | 2001092434 A | * | 4/2001 | G09G/5/00 |

\* cited by examiner

Primary Examiner—George Eng

(57) ABSTRACT

In a multimedia communications system (100) that supports conference calls that include an audio portion and a video portion, a primary video image is selected from a plurality of video images based on an amount of audio data generated. The amount of audio data is determined by counting a number of audio packets or by counting an amount of audio samples in audio packets (204). A dominant audio participant is selected if the difference in the amount of audio exceeds a predetermined threshold (206). If the difference in the amount of audio does not exceed the predetermined threshold (206), the dominant audio participant may be determined by comparing the loudness or volume for each audio participant (207 212). The primary video image is selected to correspond to the dominant audio participant (208, 214). The primary video image remains constant for a predetermined period of time before the possibility to change (210, 216).

15 Claims, 2 Drawing Sheets

MIXING VIDEO SIGNALS FOR AN AUDIO AND VIDEO MULTIMEDIA CONFERENCE CALL

FIELD OF THE INVENTION

The present invention relates generally to multimedia communications systems, and in particular, to the mixing, selecting and display of video signals for a multimedia conference call.

BACKGROUND OF THE INVENTION

Wireless communication systems are well known. Wireless communication systems allow mobile radiotelephones to communicate with each other and other networks, such as the Internet and the public telephone network. First and second generation wireless telephone systems are generally constrained in the amount of bandwidth available for communication. This limits capacity and also the types of services that are provided. Third generation wireless systems hold the promise of greater bandwidth, thereby increasing capacity and allowing for enhanced services, such as multimedia services. Proposed third generation wireless communications devices include, in addition to a voice communication interface, capability for communication of data and display of data, including video.

Audio/video or multimedia conference calls are also known. Proposed third generation wireless systems will permit wireless users to participate in multimedia conference calls, including audio, video and other data. Presently, in audio and video conference calls where there are multiple video images, one primary image is distinguished over the other video images. The one primary video image typically is associated with the present speaker on the conference call. Most typically, the primary video image is larger than the other video images. The primary video image is selected based on the loudness of the speakers. More specifically, the loudest speaker on the call determines the primary video image that is displayed for all conference call participants. When the loudest speaker changes, the primary video image changes. Presently, the determination of the loudest speaker is made by a complex comparison of the actual loudness of audio data associated with the participants. Unfortunately, this complex comparison requires computing resources and time.

Therefore a need exist for a more efficient method of mixing, selecting and displaying video signals for a multimedia conference call.

SUMMARY OF THE INVENTION

In a communications system that supports conference calls that include an audio portion and a video portion, a method is provided in accordance with the present invention for selecting a primary video image from a plurality of video images. In accordance with the method, an amount of audio data generated by each participant on the conference call is determined. Preferably, the amount of audio data is determined by counting a number of audio packets or by counting an amount of audio samples in audio packets. After the amount of audio data is determined, a dominant audio participant is selected, if possible, based upon the amount of audio data from each participant. Preferably, a dominant audio participant is selected if the difference in the amount of audio data is substantial, the dominant audio participant being the participant generating the most audio data. If a dominant audio participant is selected, a primary video image associated with that dominant audio participant is selected as the primary video image for all participants. If a dominant audio participant cannot be selected due to insubstantial differences in the amount of audio data, then a loudness or volume level for each audio participant is optionally determined and used to select a primary video image associated with the loudest participant. An apparatus for implementing the method described above includes at least one processor in a communications system that executes the method using a stored program.

DESCRIPTION OF THE PREFERRED EMBODIMENTS

Figure 1:
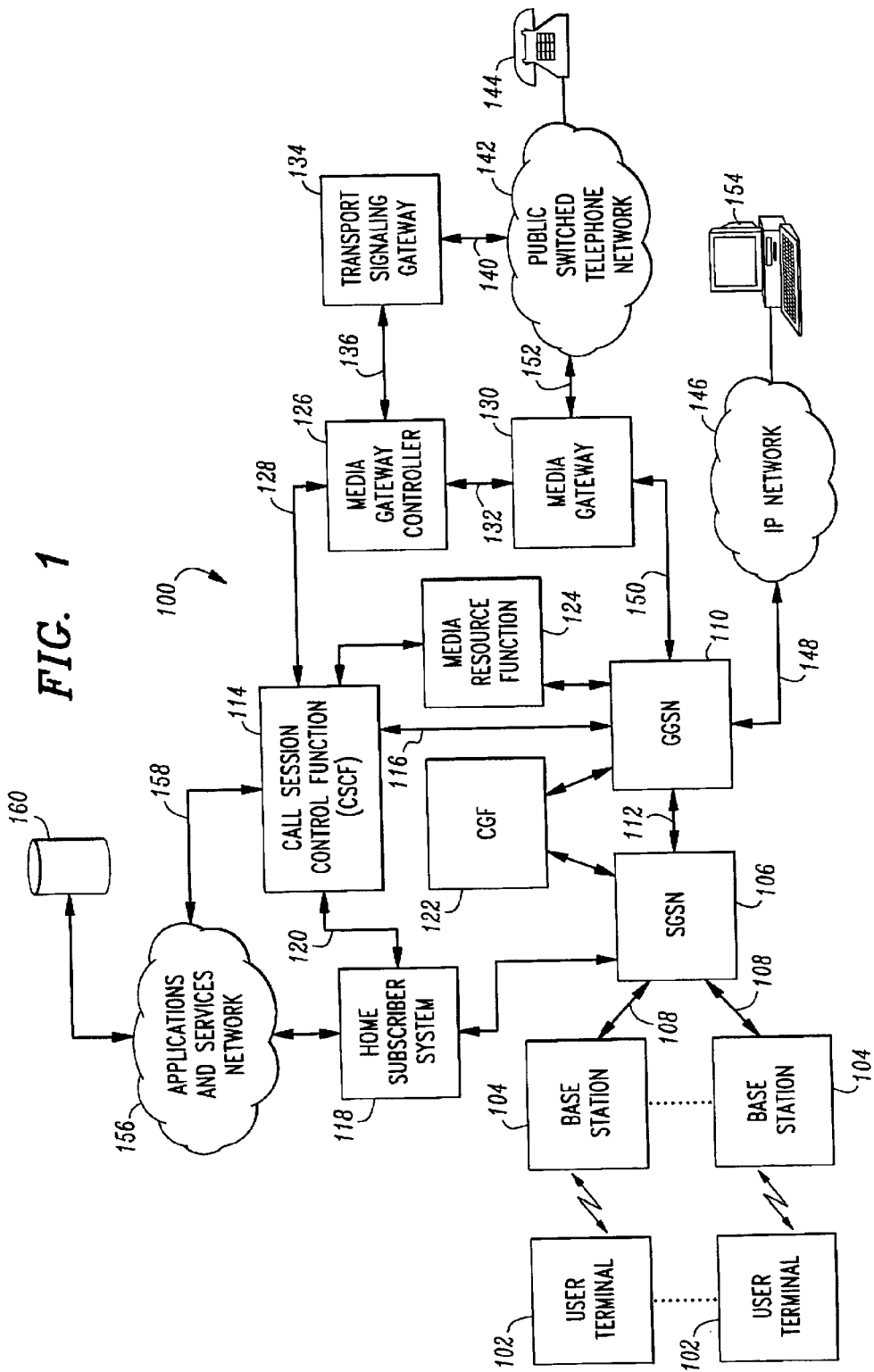
FIG. 1 is a preferred embodiment of a multimedia communications system in accordance with the present invention.

FIG. 1 is a block diagram of a preferred embodiment of a multimedia communications system 100 in accordance with the present invention. Users interact with multimedia communications system 100 via user equipment or user terminals 102. Multimedia communications system 100 includes a third generation wireless system, as defined and proposed by the $3^{rd}$ Generation Partnership Project, also known as 3 GPP (see 3 gpp.org). User terminal 102 is typically a mobile device that includes a user interface and an interface for coupling to communications system 100. The user interface of user terminal 102 is typically referred to as terminal equipment and generally includes an audio interface, such as a microphone and speakers, a visual interface, such as a display, and a user input interface, such as a keyboard or touch pad. The interface for coupling to communications system 100 is typically referred to as a mobile terminal and generally includes an over-the-air interface for transmitting and receiving data.

The over-the-air interface of user terminal 102 is used to communicate with base stations 104. In the preferred embodiment, base stations 104 include an over-the-air interface that is complementary to the over-the-air interface of user terminal 102. Most preferably, user terminal 102 and base stations 104 communicate over the air using a packet-based protocol.

Multimedia communications system 100 provides users with a variety of options for communication. Users are able to transmit and receive multimedia communications, including audio, voice, video, and all types of data. Multimedia communications system 100 provides access to data networks, such as the Internet, and public telephone networks, including wireless networks.

In the preferred embodiment, the multimedia communications that are directed to and received from users via base stations 104 are coordinated and transferred using a serving GPRS (GSM Packet Radio System) support node (SGSN) 106, a gateway GPRS support node (GGSN) 110, a call session control function (CSCF) 114 and a home subscriber system 118. SGSN 106 coordinates multimedia transmissions to and from base stations 104. SGSN 106 is coupled to GGSN 110 via a data link 112. GGSN 110 interfaces the multimedia communications to and from SGSN 106 to other networks. Call session control function 114 is coupled to GGSN 110 via a data link 116. Call session control function 114 coordinates and executes a signaling protocol used to establish, maintain and control calls or sessions for communications involving user terminal 102. A home subscriber system 118 is coupled to call session control function 114 via a data link 120. Home subscriber system 118 includes subscriber profile information, including information traditionally associated with a home location register for a mobile subscriber.

To facilitate ancillary and support functions within multimedia communications system 100, a charging gateway function (CGF) 122 and a media resource function 124 are provided. Charging gateway function 122 is coupled to SGSN 106 and GGSN 110 to account for packets passing through these elements for accounting, billing and other purposes. Media resource function 124 is coupled to call session control function 114 and to GGSN 110. Media resource function 124 provides resources for conference bridging, tones, announcements, text-to-speech conversion, automatic speech recognition and other service functions for communications through GGSN 110.

GGSN 110 couples user terminals 102 to other networks. In particular, GGSN 110 is coupled to an Internet protocol (IP) network 146 via a data link 148. Data link 148 preferably implements a packet-based protocol for transfers to a data network. Data link 148 and IP network 146 provide access to any elements connected to IP network 146, such as, for example, a computer 154. GGSN 110 is also coupled to a media gateway 130 via a data link 150. Media gateway 130 is in turn coupled to a public switched telephone network 142 via a communications link 152. Media gateway 130 converts data received from GGSN 110 to a data protocol acceptable to the public switched telephone network 142. Conversely, media gateway 130 converts data received from public switched telephone network 142 to a protocol acceptable to GGSN 110. Media gateway 130, data link 150, and communications link 152 provide an interface for user terminal 102 to the public switched telephone network 142. By virtue of this connection, user terminal 102 is coupled to elements attached to the public switched telephone network, such as telephone 144.

The signaling and control necessary to interface GGSN 110 with public switched telephone network 142 is controlled and provided by call session control function 114, a media gateway controller 126 and a transport signaling gateway 134. Media gateway controller 126 is coupled to call session control function 114 via a data link 128. Media gateway controller 126 is coupled to control media gateway 130 via data ink 132. Call session control function 114 determines based on a signaling protocol any necessary media gateway resources needed for a particular communication or session. These needs are transmitted to media gateway controller 126, which in turns configures and establishes the necessary resources in media gateway 130 and also provides the necessary signaling to transport signaling gateway 134. The resources in media gateway 130 are configured to transfer the actual (bearer) data between the GGSN 110 and the public switched telephone network 142. Transport signaling gateway 134 converts the signaling protocol from the media gateway controller 136 to a signaling protocol necessary for public switched telephone network 142.

Applications and services are preferably coupled to multimedia communication system 100 for use in interaction with user terminals 102. In particular, call session control function 114 is coupled to an applications and services network 156 via a data link 158. Also, home subscriber system 118 is preferably coupled to application and services network 156. A myriad of services and applications may reside in or be coupled to application services network 156, including database services from a database 160.

In the preferred embodiment, SGSN 106, GGSN 110, CGF 122, media resource function 124, CSCF 114, media gateway controller 126, media gateway 130, and home subscriber system 118 are processor-based apparatus with data link interfaces for coupling together as described above and shown in FIG. 1. These apparatus include one or more processors that execute programs to implement the functionality described herein and generally associated with third generation wireless systems.

Figure 2:
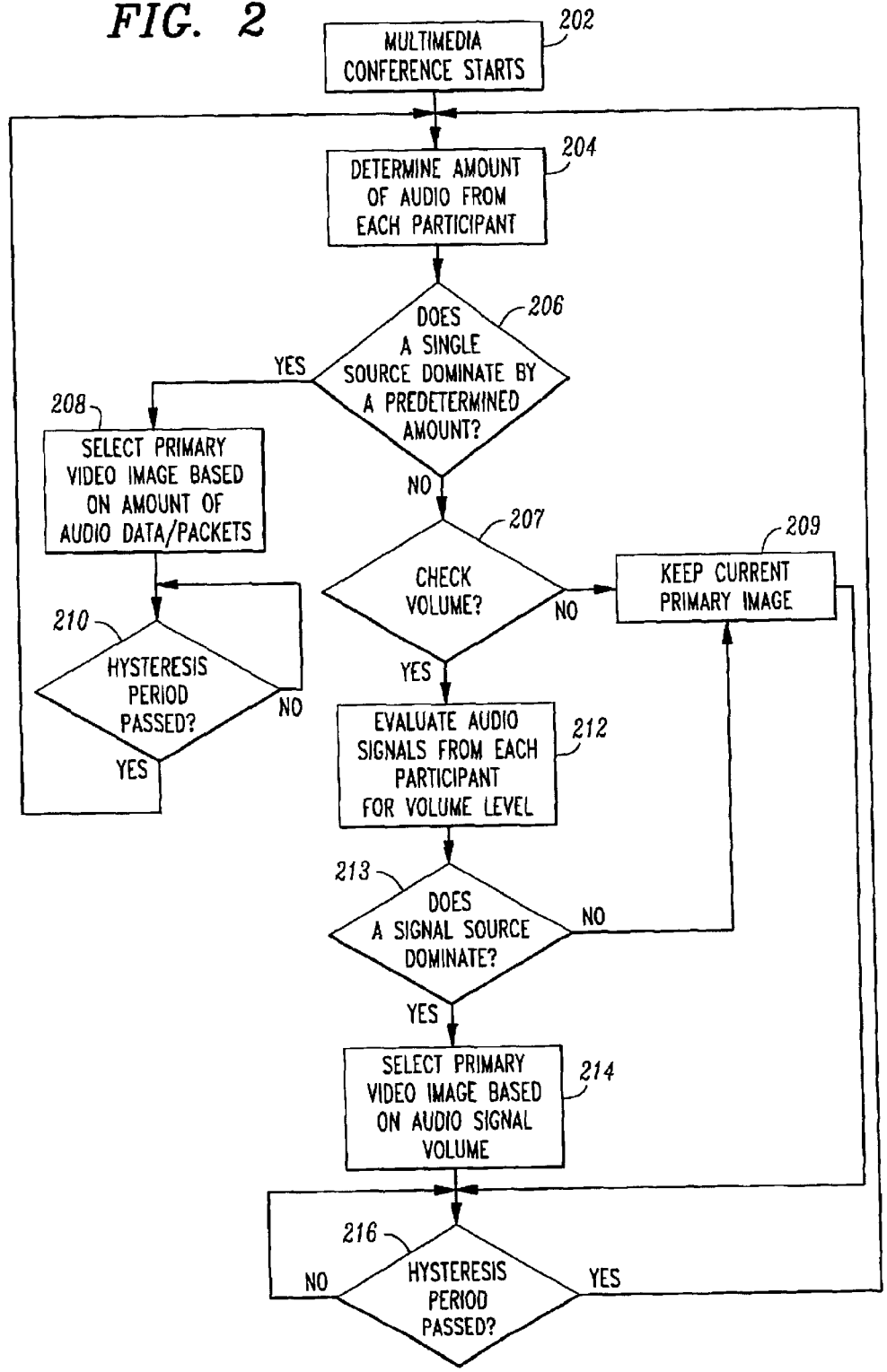
FIG. 2 is a flow chart illustrating a method for mixing audio and video signals during a conference call in accordance with the present invention.

FIG. 2 is a flow chart illustrating a method for selecting a primary video image from a plurality of video images associated with a multimedia conference call in accordance with the present invention. FIG. 2 is discussed below with reference to the preferred embodiment of FIG. 1. First, the multimedia conference call starts (202). In the preferred embodiment, the multimedia conference call includes at least one user terminal 102 coupled over the air to multimedia communications system 100. The multimedia conference call preferably includes multiple participants with at least audio and video generated for some of the participants. During the multimedia conference call a primary video image is selected for display at each participant's equipment. Most preferably, the primary video image is most prominently displayed, while secondary video images are less prominently displayed. For example, a primary video image may consume 50 percent of a display or window on the user's equipment and the secondary video images may share the remaining 50 percent of the display or window. Alternatively, the primary video image is the same size as the secondary video images, but is otherwise highlighted or distinguished for the user.

The primary video image preferably corresponds to a display relating to the speaker on the videoconference. The display may be an image of the speaker or may be an image of an exhibit or image selected or otherwise being used by the speaker. At the beginning of the multimedia conference, a default primary video image is selected as the primary video image. The default video image is alternatively determined by a participant or is selected based on the party establishing the multimedia conference.

In the preferred embodiment, media resource function 124 includes a conference circuit that receives all inputs, including audio and video, from the conference participants and distributes a mixed output to all conference participants. The mixed output preferably includes and distinguishes the primary video image. Most preferably, media resource function 124 receives audio, video and other packets from the conference participants. In accordance with the present invention, the audio packets received from conference participants are analyzed to select the primary video image for display.

Accordingly, a count of audio packets from each participant is determined (204). The count is preferably a measure of the amount of audio being generated from each participant. Where the audio packets are of a fixed or constant size, a mere count of packets provides the necessary data. Where the audio packets vary in size, the actual audio data in the packets is preferably counted or determined. Preferably, audio packets that represent silence or only ambient noise (i.e., no talking) are accounted for in the count such that the count reflects the level of audio above and beyond ambient sound at a participant's location. Ideally, where only one participant is speaking at a particular time, only audio packets associated with that participant are received by the conference function.

After the count of audio packets is determined (204), the count is used to determine whether a single participant is dominating the audio portion of the conference (206). In other words, does the count of audio data reflect a single participant generating or dominating the audio portion of the conference. In the ideal case, where only one participant is speaking at a particular time, only audio packets associated with that participant are received by the conference function, and therefore, that participant is dominating the audio portion of the conference. Preferably, a differential in audio data count among the participants is used to determine whether a particular participant is dominating the audio portion of the call (206). For example, if 90 percent of the audio packets received are from a particular participant, then that participant is selected as dominating the audio portion of the conference. Other thresholds based on a fixed number of packets or data may also be used.

If a particular participant is dominating the audio portion of the conference (206), then the primary video image that is sent to all participants is selected based on the participant dominating the audio portion of the conference call (208). The primary video image is alternatively, the video image of the participant dominating the audio or an exhibit or image selected by the participant dominating the audio.

Preferably, a hysteresis period is chosen during which the primary video image does not change. This prevents inadvertent and undesirable changes in the primary video image. In a preferred embodiment, the hysteresis period is selected to be between 1 to 3 seconds. After a primary video image is selected, a check is made to determine whether the hysteresis period has passed (210). If the hysteresis period has not passed, the selected primary video image is not change. If the hysteresis period has passed (210), then a new evaluation is begun to determine the primary video image (204).

If the count of audio data does not reflect that a particular participant is dominating the audio portion of the conference (206), then a further evaluation to determine volume levels for each participant may be performed to select the primary video image. This option is selected by the system or by a conference participant. If the further evaluation based on volume level is not selected (207), then the current primary video image is retained (209), at least for a hysteresis period (216). If the further evaluation based on volume level is selected (207), then each audio signal, as reflected by the audio packets, is analyzed to determine the loudness or volume of that particular signal (212). Preferably, digital signal processing techniques are used in evaluating and analyzing the loudness or volume of the audio signals. Based on the analysis of loudness, a determination is made as to whether a particular participant dominates the audio portion of the call (213). Preferably, a differential in loudness or volume is used to determine whether a particular participant is dominating. A threshold difference may be required before a single source is considered dominating. If a particular participant is not dominating the audio portion of the call (213), then the primary video image is retained (209), at least for the hysteresis period (216). If a particular participant is dominating the audio portion (213), the primary video image is selected based on the dominating participant (214). Most preferably, the loudest audio signal is used to select the primary video image. The primary video image is typically a video image of the loudest speaker or an exhibit or image selected by the loudest speaker. A hysteresis period is again used to prevent undesirable and frequent changes in the primary video image. If the hysteresis period has not passed (216), then the primary video image is not change. Once the hysteresis period passes (216), a new cycle of analysis begins to determine the primary video image (204). The primary video image is selected and changed in accordance with the method illustrated in FIG. 2 until the multimedia conference ends.

As discussed above, a primary video image for a multimedia conference call it is selected. Advantageously, a simple count of audio data or packets is used as a first measure to determine the primary video image. Complex loudness and volume analysis of the audio signals from participants may be used where the count of audio data or packets does not reflect a participant dominating the audio portion of the conference call. When needed, loudness and volume analysis is readily performed. The period of hysteresis prevents inadvertent and undesirable changes in the primary video image.

Whereas the present invention has been described with respect to specific embodiments thereof, it will be understood that various changes and modifications will be suggested to one skilled in the art and it is intended that the invention encompass such changes and modifications as fall within the scope of the appended claim.

What is claimed is:

1. In a communications system that supports conference calls that include an audio portion and a video portion, a method for selecting a primary video image from a plurality of video images, the method comprising the steps of:

receiving audio data in a digital form;

determining an amount of the audio data in digital form generated by each participant of a plurality of participants in a conference call;

selecting a dominating audio participant from the plurality of participants based upon the amount of the audio data in digital form generated by each participant of the plurality of participants;

and selecting a primary video image based on the dominating audio participant, wherein the step of determining an amount of the audio data in digital form comprises counting a number of one of audio packets and audio samples in packet form generated by each participant of the plurality of participants.

2. The method of claim 1 wherein the step of determining an amount of the audio data in digital form comprises counting an amount of audio samples in audio packets.

3. The method of claim 1 wherein the primary video image is larger than a plurality of remaining video images of the plurality of video images.

4. The method of claim 1 further comprising the step of maintaining the primary video image for at least a predetermined period of time.

5. In a communications system that supports conference calls that include an audio portion and a video portion, a method for selecting a primary video image from a plurality of video images, the method comprising the steps of:

receiving audio data in a digital form;

determining an amount of the audio data in digital form generated by each participant of a plurality of participants in a conference call;

determining whether a difference between an amount of the audio data in digital form generated by one participant of the plurality of participants and an amount of the audio data in digital form generated by other participants of the plurality of participants exceeds a predetermined threshold;

if the difference exceeds the predetermined threshold, then selecting a dominating audio participant from the plurality of participants based upon the amount of the audio data in digital form generated by each participant of the plurality of participants; and selecting a primary video image based on the dominating audio participant, wherein the step of determining an amount of the audio data in digital form comprises counting a number of one of the audio samples in packet form generated by each participant of the plurality of participants.

6. The method of claim 5 wherein the dominating audio participant generates an amount of the audio data in digital form that exceeds an amount of the audio data in digital form generated by each of a plurality of remaining participants of the plurality of participants.

7. The method of claim 5 further comprising the step of:

if the difference does not exceed the predetermined threshold, then determining a loudness of audio for each participant of the plurality of participants; and selecting the dominating audio participant based on the loudness for each participant of the plurality of participants.

8. The method of claim 5 wherein the step of determining an amount of the audio data in digital form comprises counting an amount of audio samples in audio packets.

9. The method of claim 5 wherein the primary video image is larger than a plurality of remaining video images of the plurality of video images.

10. The method of claim 5 further comprising the step of maintaining the primary video image for at least a predetermined period of time.

11. In a communications system that supports conference calls that include an audio portion and a video portion, an apparatus for selecting a primary video image from a plurality of video images, the apparatus comprising:

a first processor that:
receives audio data in a digital form; and
determines an amount of the audio data in digital form generated by each participant of a plurality of participants in a conference call;

a second processor that selects a dominating audio participant from the plurality of participants based upon the amount of the audio data in digital form generated by each participant of the plurality of participants; and a third processor that selects a primary video image based on the dominating audio participant, wherein the first processor determines an amount of the audio data in digital form by counting a number of one of audio packets and audio samples in packet form generated by each participant of the plurality of participants.

12. The apparatus of claim 11 wherein the first processor, the second processor and the third processor are a same processor.

13. The apparatus of claim 11 wherein at least two of the first processor, the second processor and the third processor are a same processor.

14. The apparatus of claim 11 wherein the primary video image is larger than a plurality of remaining video images of the plurality of video images.

15. The apparatus of claim 11 wherein the first processor determines an amount of the audio data by counting an amount of the audio samples in audio packets.

* * * * *

UNITED STATES PATENT AND TRADEMARK OFFICE
CERTIFICATE OF CORRECTION

PATENT NO. : 6,894,715 B1
DATED : May 17, 2005
INVENTOR(S) : Eric Harold Henrikson It is certified that error appears in the above-identified patent and that said Letters Patent is hereby corrected as shown below:

Title page,
Item [73], Assignee, insert -- Lucent Technologies Inc. Murray Hill, NJ (US) --.

Signed and Sealed this

Sixteenth Day of August, 2005

JON W. DUDAS
*Director of the United States Patent and Trademark Office*